United States Patent
Rausch et al.

(10) Patent No.: US 7,349,512 B2
(45) Date of Patent: Mar. 25, 2008

(54) CLOCK SYNCHRONIZATION IN A DISTRIBUTED SYSTEM

(75) Inventors: Mathias Rausch, Markt Schwaben (DE); Bernd Müller, Leonberg (DE); Bernd Hedenetz, Denkendorf (DE); Anton Schedl, München (DE)

(73) Assignees: Motorola, Inc., Schaumburg, IL (US); Robert Bosch GmbH, Stuttgart-Feuerbach (DE); DaimlerChrysler AG, Stuttgart (DE); Bayerische Motoren Werke, Munich (DE)

( * ) Notice: Subject to any disclaimer, the term of this patent is extended or adjusted under 35 U.S.C. 154(b) by 689 days.

(21) Appl. No.: 10/484,683

(22) PCT Filed: Jul. 24, 2002

(86) PCT No.: PCT/EP02/08261

§ 371 (c)(1),
(2), (4) Date: Aug. 23, 2004

(87) PCT Pub. No.: WO03/010611

PCT Pub. Date: Feb. 6, 2003

(65) Prior Publication Data

US 2005/0013394 A1    Jan. 20, 2005

(30) Foreign Application Priority Data

Jul. 26, 2001    (EP)    ................................. 01118177

(51) Int. Cl.
H04L 7/00    (2006.01)

(52) U.S. Cl. ........................ 375/356; 370/252; 370/216

(58) Field of Classification Search ................ 375/356; 370/252, 216
See application file for complete search history.

(56) References Cited

U.S. PATENT DOCUMENTS

| | | | | |
|---|---|---|---|---|
| 5,694,542 A | * | 12/1997 | Kopetz | ........................ 714/49 |
| 6,654,355 B1 | * | 11/2003 | Marbach et al. | ............ 370/285 |
| 6,654,356 B1 | * | 11/2003 | Eidson et al. | ............... 370/303 |

FOREIGN PATENT DOCUMENTS

| | | |
|---|---|---|
| EP | 0 394 051 A2 | 10/1990 |
| EP | 0394051 | 10/1990 |

OTHER PUBLICATIONS

International Search Report.
European Search Report.
Welch, J. L. and Lynch, Nancy, "A New Fault-Tolerant Algorithm for Clock Synchronization," Information and Computation, vol. 77, No. 1, 1988, pp. 1-36. (Spec, p. 13).
Lundelius, J. and Lynch, Nancy, "A New Fault-Tolerant Algorithm for Clock Synchronization," Proc. of the Third ACM Symp. on Principles of Distributed Computing, 1984, pp. 75-88.

* cited by examiner

*Primary Examiner*—David C. Payne
*Assistant Examiner*—Rahel Guarino
(74) *Attorney, Agent, or Firm*—Collard & Roe, P.C.

(57) ABSTRACT

The present invention provides an improved clock synchronization algorithm for a distributed system intended for real time applications by performing at the same time an off-set correction and a clock read correction at each node of the distributed system. Expensive oscillators can be avoided and synchronization can be established faster and with higher precision.

29 Claims, 11 Drawing Sheets

CLOCK SYNCHRONIZATION IN A DISTRIBUTED SYSTEM

CROSS REFERENCE TO RELATED APPLICATIONS

Applicants claim priority under 35 U.S.C. 119 of European Application No. 01118177.3 filed on Jul. 26, 2001. Applicants also claim priority under 35 U.S.C. §365 of PCT/EP02/08261 filed on Jul. 24, 2002. The international application under PCT article 21(2) was published in English.

The present invention relates to the synchronization of a distributed system for real time applications, particular to a method for synchronizing nodes in the distributed system with a local real time clock in each node and to a synchronizing unit included in the nodes.

A distributed system consists of a number of nodes which are loosely connected by a communication link. Each node of the distributed real time system contains an own local real time clock. The accuracy of these clocks is based on the accuracy of the quarts crystal included in each of the local clocks. A real time application which is controlled by the distributed system requires the synchronization of the local clocks of the nodes. The synchronized time is generally called "global time".

In a distributed system, a global time is an important functionality for real time applications. Real time tasks may for instance depend on messages from tasks of different nodes. Scheduling such tasks requires timing information to be meaningful not only locally. A system comprising clocks at different nodes, however, does not necessarily show the same time. Usually, there is an off-set between the clocks and often they do not run at exactly the same frequency. Moreover, this frequency is not constant but may depend on temperature, for instance.

Internal synchronization among nodes is to be distinguished from external synchronization to a reference time source. Apart from the traditional area of automated applications, distributed real time systems are increasingly implemented by the car making industry. Presently, control devices in a car are connected using the CAN bus system, in particular for controlling car engines or automatic transmissions. The number of control systems combining multiple sensors, actuators and electronic control units is significantly increased. The continuing use of control systems and sensors, actuators and electronic control units connected thereto place demands on thee communication technology currently not addressed by existing communication protocols. In particular the introduction of automotive "by-wire" systems introduce additional requirements for future in-car control applications wherein reliability is of particular importance. This includes a clock synchronization service suitable for safety-critical control applications.

The present invention is particularly intended for use in an advanced automotive communication system named FlexRay. The applicants are members of an industry consortium formed to develop and implement FlexRay technology aiming to define a standard for innovated high speed control applications in a car, such as x-by-wire.

Future automotive applications demand high speed bus systems that are deterministic and fault-tolerant and capable of supporting distributed control systems. The FlexRay communication system allows synchronous and asynchronous gross data transmission at high speed data rates up to 10 Mbit/s. This technology supports redundancy and fault-tolerant clock synchronizations for a global time base.

Existing bus systems may be differentiated depending on the kind of handling access to the bus, namely either time multiplex, frequency multiplex or code multiplex. In the field of real-time control systems there are two fundamentally different principles how to control the activity of the system, namely time-triggered control or event-triggered control. In time-triggered systems, all activities are carried out at certain points in time known a priori. Accordingly, all nodes in time-triggered systems have a common notion of time, based on approximately synchronized clocks. In contrast, in the event-triggered systems all activities are carried out in response to relevant events external to the system. A main difference between both systems is the deterministic behavior. Systems controlling access to the bus based on predefined rules, guarantee that each node may exclusively access the bus within a certain time period for transmitting messages. Event-triggered systems handle access based on assigned priorities and, thus, cannot guarantee a deterministic behavior.

A distributed real time system depends on fault-tolerant clock synchronization. This is particular true in distributed architectures in which nodes perform their actions according to a predetermined schedule. Such time-triggered systems are mainly used in safety-critical applications. Clocks synchronization is an essential element of a time-triggered architecture to function properly.

In a distributed real time system, synchronization may be realized by the exchange of messages in order to avoid separate channels used for the synchronization of the local clocks. The synchronization procedure itself should tolerate faulty clocks and missing messages.

The present invention is intended for time-triggered architectures being employed in connection with devices controlling safety-critical electronic systems without mechanical back-up, "by-wire" systems for steering, braking or suspension control. High trust must be placed in its correct functioning.

Clock synchronization is the most basic service for achieving the required real-time properties.

A known fault tolerant real-time communication system is the Time-Triggered Protocol (TTP), a communication protocol particularly suitable for safety-critical control applications. The synchronization algorithm of TTP does not use special synchronization messages which provide the reading of a node's clock to other nodes. The delay of arrival of incoming messages is used to estimate the value of the sender's clock. Further, TTP provides a means to collect timing information only from selected nodes and ignores clock values of nodes that are known to have oscillators of inferior quality. Clock synchronization and the corresponding time measurement are performed on a cyclic basis.

The distinguishing characteristic of time-triggered systems is that all system activities are initiated by the progress of time. The TTP protocol operates cyclically. Each node is supplied with a clock and a static schedule. The schedule determines when certain actions have to be performed, in particular when messages of a certain type are to be sent by a particular node.

The schedule contains global information common to all nodes, such as a duration of a given slot or the identity of the sending node. As the intended system behavior is thus known to all nodes, important information can be obtained indirectly from the messages.

Access to the system bus is determined by a time-division multiple access (TDMA) schema which is precompiled into the schedule. Every node owns certain slots, in which it is allowed to send messages on the bus. A complete cycle during which every nodes has had access to the bus once is called TDMA round. After a TDMA round is completed, the same temporal access pattern is repeated again.

The clocks of the nodes must be synchronized tightly enough to agree on the current slot and to scan the bus at appropriate times for messages to arrive. To prevent a faulty node from speaking out of turn, the bus interface is controlled by a "bus guardian" giving access to the bus only at appropriate times. Each node is supplied with a physical clock which is typically implemented by a discrete counter. The counter is incremented periodically, triggered by a crystal oscillator.

As such oscillators do not resonate with a perfectly constant frequency, the clocks drift apart from real time. It is the task of clock synchronization to repeatedly compute an adjustment of a node's physical clock in order to keep it in agreement with the other node's clock. The adjusted physical clock is what is used by a node during operation.

The most simple way of clock adjustment is a one-step adaptation, wherein the current off-set to the real time is simply added to the clock. This procedure may cause consistency problems.

In another approach, the clock speed is varied to run faster or slower in order to compensate clock deviations. The time of a clock runs faster or more slowly until an off-set is compensated for. A positive off-set may be compensated by the clock running more slowly and an opposite off-set may be compensated by the clock running more fast. However, the clock will keep on drifting and needs to be adjusted continuously.

In the TTP system the clock synchronization algorithm operates together estimates of readings of other node's clock to estimate an adjustment for the local clock. Since every node knows beforehand at which time certain messages will be sent the difference between the time a message is expected to be received by a node and the actual arrival time can be used to calculate the deviation between the sender's and the receiver's clock. In this way no special synchronization messages are needed in TTP.

Clock synchronization in the TTP protocol requires crystal oscillators which resonate in almost perfectly constant frequencies in order to arrive at a maximum clock deviation for each TDMA round being as small as possible.

Starting from this prior art, it is the problem of the present invention to further improve clock synchronization, in particular to reduce the costs for crystal oscillators and achieving smaller maximum clock deviations.

This is achieved by the features of claim 1 for a method of synchronizing nodes and by the features of claim 19 for a synchronizing unit.

The present invention avoids the use of expensive crystal oscillators by adjusting the local clock in a node by an off-set correction value and, in addition, by a clock rate correction value.

In this way, an internal clock synchronization of all clocks is achieved faster and with higher precision. The exact rate correction protects the clocks for an increasing off-set overtime and the additional off-set correction decreases the existing off-set between the clocks of the nodes.

According to a preferred embodiment of the present invention, the clock rate correction is calculated based on a set of clock rate deviations between the local clock of a node and other nodes.

In a first preferred embodiment, the set of clock rate deviations is calculated from two sets of time deviations which are determined between the local clock of the node and the other nodes.

In a second preferred embodiment, the set of clock rate deviations is based on a difference between a measured time interval of received messages for a particular node based on its local clock and an expected time interval.

Preferably, the present invention is employed in a TDMA system comprising cycles of a predefined access pattern for the nodes of the distributed system to the communication link. Such a time-triggered architecture allows to employ the synchronization method in connection with safety-critical electronic systems.

Preferably, the synchronization is carried out in a TDMA system and two TDMA rounds or cycles are used for measuring deviations before a correction value is calculated and the clock is corrected.

By only taking particular nodes into account when calculating a correction value, the fault tolerant behavior can be increased and the memory effort may be reduced.

According to a further preferred embodiment, an amount of a calculated clock rate correction value is reduced before adjusting the clock based on the correction value. Such a decreased clock rate correction value results in an improved clock synchronization stability and prevents the cluster of nodes from a cluster drift and shifts the whole cluster from extreme frequency values towards a mean value of all clock frequencies of the cluster.

Other preferred embodiments of the invention are subject to various dependent claims.

In the following, embodiments of the invention are described in further detail with reference to the accompanying drawings in which.

Figure 1:
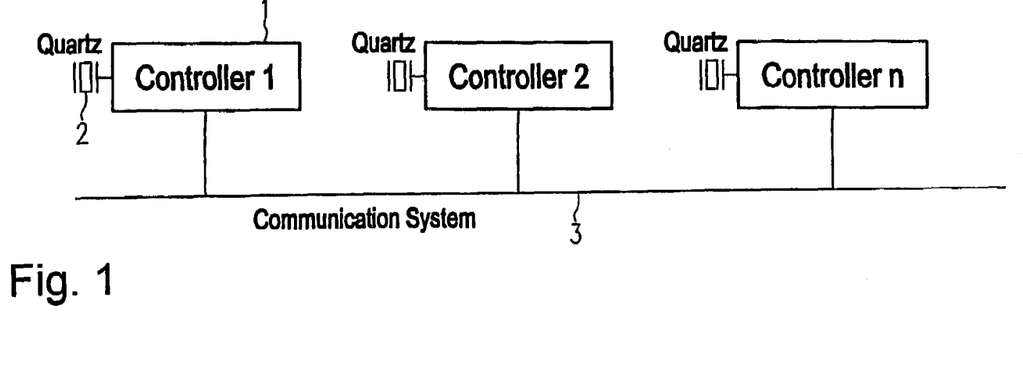
FIG. 1 illustrates the general structure of the distributed system in a simplified manner.

FIG. 1 shows a simplified example of a distributed system comprising a plurality of nodes. Each of the nodes is supplied with a clock, comprising a crystal oscillator 2. For sending messages, each node 1 is connected to a communication link to access the bus for receiving or transmitting messages. This communication link may further comprise optional redundant communication channels and is designed to support a gross data rate of approximately 10 Mbit/sec.

Each node is not only supplied with its own clock but also with additional information common to all of the nodes. The common information relates to the communication structure, such a duration of a given slot or the identity of a sending node. The intended system behavior is known to all of the nodes and important information can be obtained indirectly from the messages received. For example, explicit acknowledgements need not be sent since a receiving node can determine that a message is missing immediately after the anticipated arrival time has passed.

Figure 2:
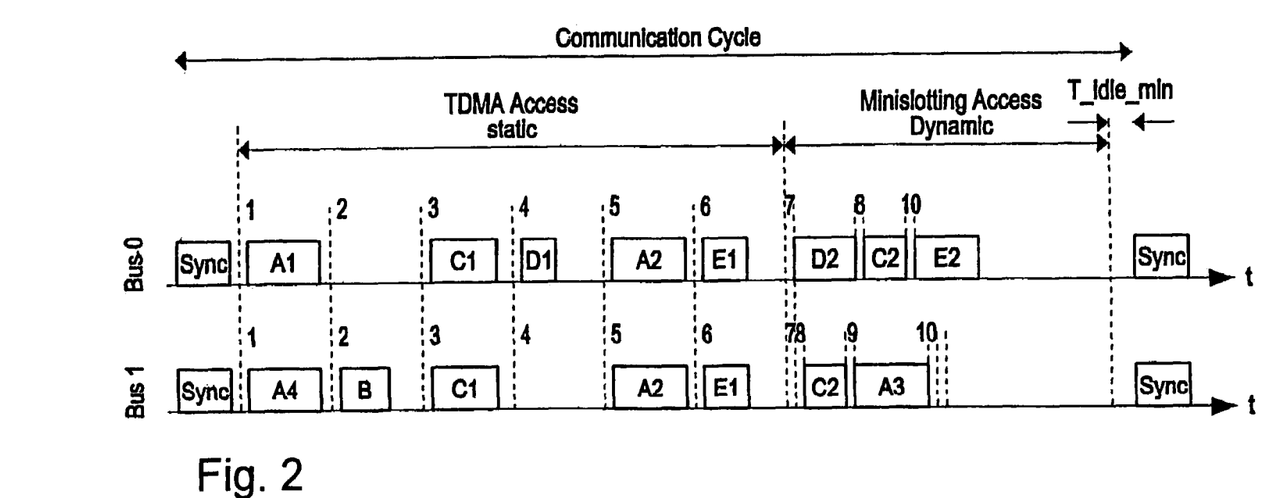
FIG. 2 illustrates an example of a typical access scheme.

Access to the communication link or bus 3 is determined by a time-division multiple access (TDMA) schema. Every node owns certain slots within the access scheme in which it is allowed to send messages on the bus. A complete cycle during which every node has had access to the bus once is called a TDMA round. An example for such a single communication cycle is shown in FIG. 2. The communication cycle shown in FIG. 2 comprises two portions, namely a static portion and a dynamic portion. In the static portion, each node only accesses the bus at its appropriate times. This can be seen in the static TDMA accessed portion wherein each of the six time slots may be accessed by a particular one for all of the nodes. In the dynamic portion, each node may access the bus according to a predefined scheme providing a collision free access for transmitting messages.

After a TDMA round is completed, the same temporal access pattern is repeated again.

Figure 3:
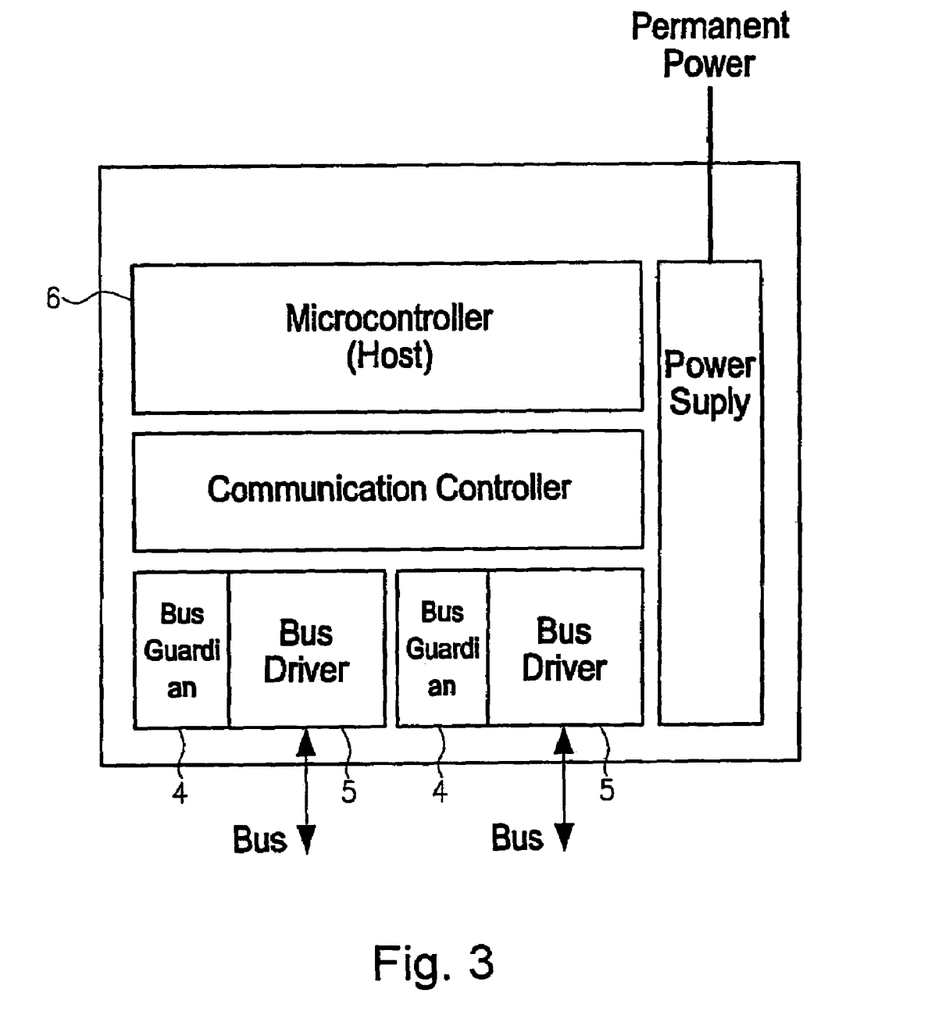
FIG. 3 gives an example of a simplified block-diagram of a node connected to the communication system.

Each communication node may comprise two bus guardians 4 and a corresponding driver 5 to control access of each node to the bus(es) as shown in FIG. 3. All units within a communication node are connected to a single power supply. The bus guardian 4 operates based on the stored information on each of the nodes of the distributed system indicating a sending time and a period allowed for sending. The bus guardian 4 controls access to the communication link which is only allowed at said predetermined points of time. The information initially stored in the host 6 is transferred and stored in the bus guardian during operation.

Figure 4:
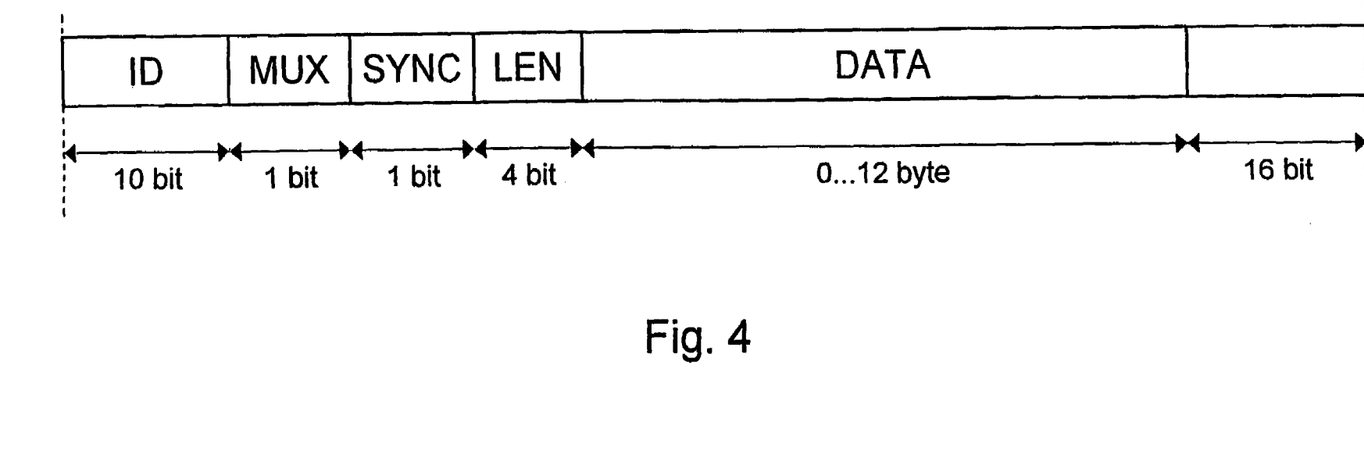
FIG. 4 gives an example for the structure of a message to be transmitted on the communication system.

FIG. 4 gives an example for a message format transmitted on the communication link. The message form is the same either for all messages either transmitted during the static or dynamic portion of a TDMA round. Each message comprises the following fields:

ID: an identifier, 10 bit, range 1 . . . 1023, which defines a slot-position in the static part and a priority of a message in the dynamic part. The smaller the identifier the higher the priority. Each identifier is preferably only used once in the system. Each node may use one or a plurality of identifiers.

MUX: Multiplex field, 1 bit, which enables a node to transmit different messages with the same ID.

SYNC: synchronization field, 1 bit, indicating whether a message is used for clock synchronization.

LEN: length field, 4 bit, which indicate the number of data bytes used (0 . . . 12).

D00 . . . D11: data bytes, 0-12 bytes.

CRC: 16 bit (or 15 bit), used for a cyclic redundancy check.

Figure 5:
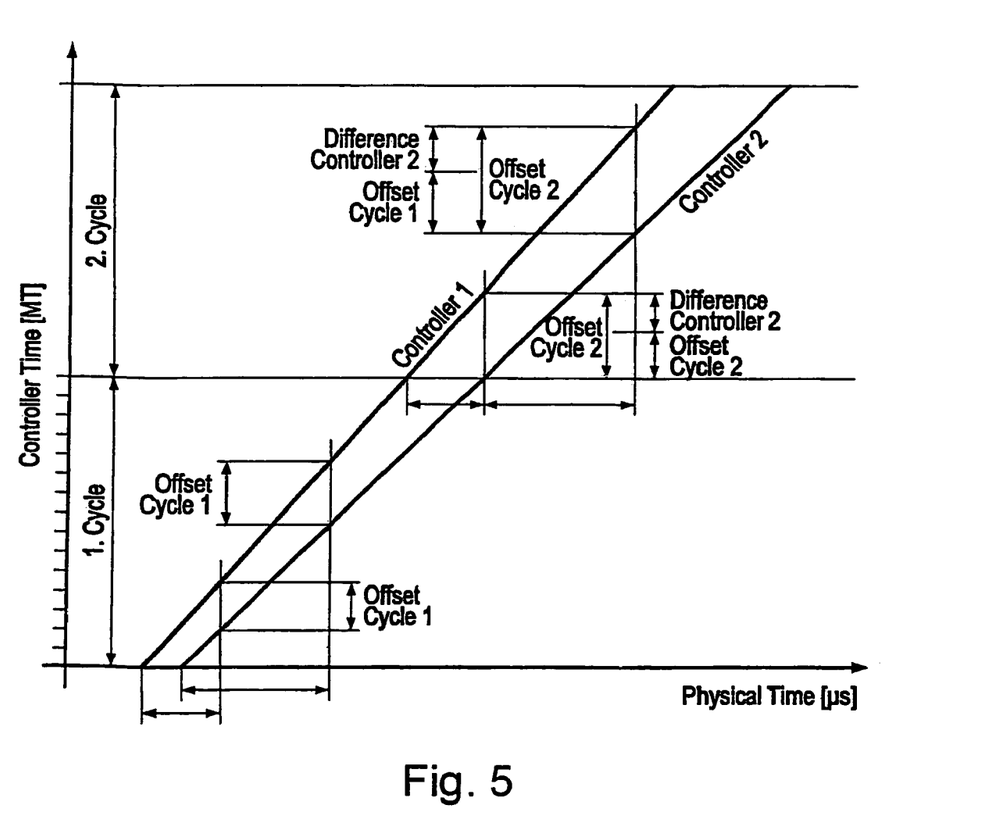
FIG. 5 illustrates the measured clock deviation.

The clock synchronization algorithm operates by gathering estimates of the times of other node's clock to estimate an adjustment of the local clock. Every node knows beforehand at which time certain messages will be sent. Thus, the difference between the time a message is expected to be received by a node and the actual arrival time can be used to calculate a deviation between the sender's and the receiver's clock. In this way no special synchronization messages are needed. The measurement which is carried over two TDMA rounds is illustrated in FIG. 5. The time of two nodes or controllers is shown by bold lines in FIG. 5 which are designated "controller 1" and "controller 2". As can be seen, the time of both controllers slightly differ by each other, shown in a time off-set and a time deviation increasing over the time.

In a first cycle, each of both nodes determines the time difference between its own time and the time of the other node based on a received message. The resulting difference also depends on the access pattern of each particular node. The same procedure is carried out in a consecutive cycle having the same access pattern. Due to the different clock frequencies, the time deviations detected by each of the nodes are further increased. This additional difference is used to evaluate frequency differences between both clocks and to adjust the clocks based on a calculated common time basis.

Figure 6:
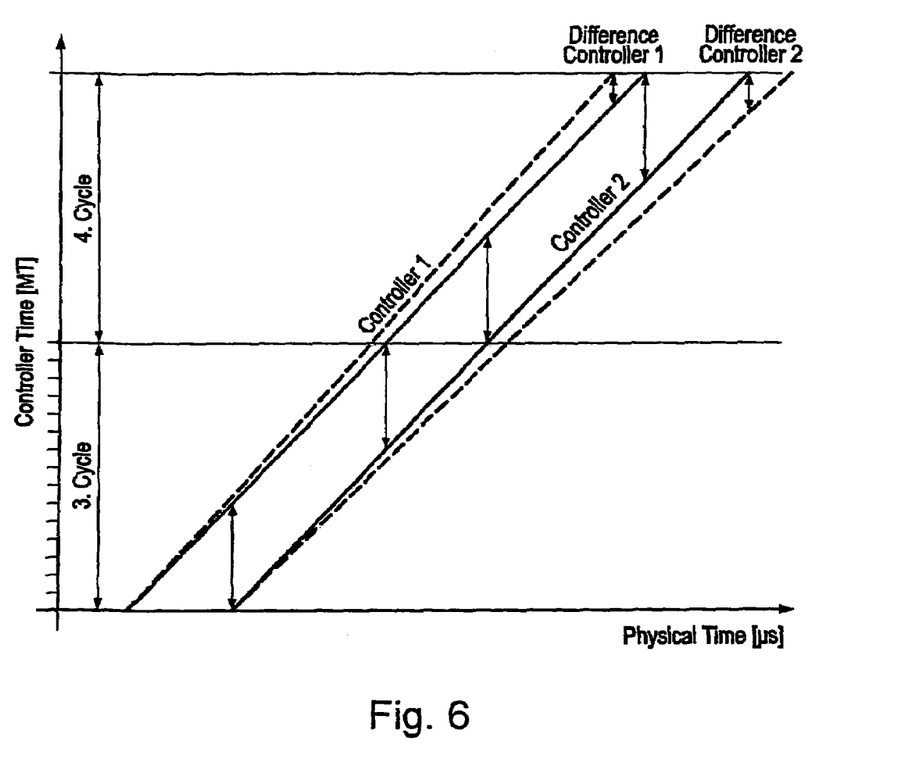
FIG. 6 illustrates a clock rate correction.
Figure 7:
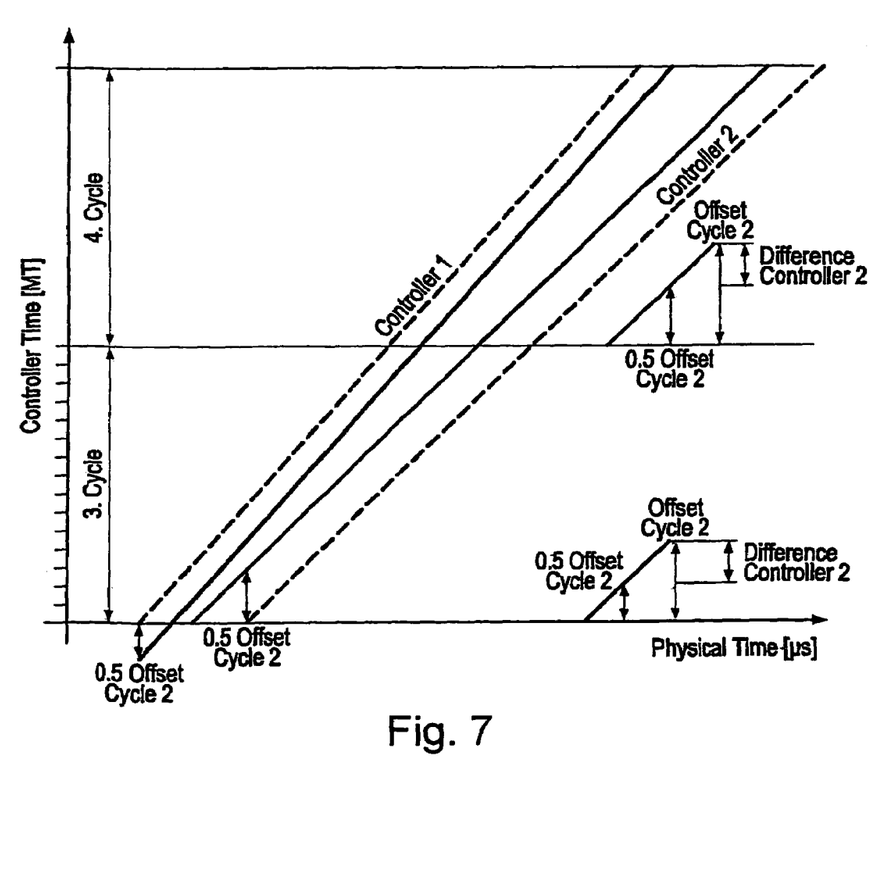
FIG. 7 illustrates an off-set correction.

The results achievable by the clock correction procedures are shown in FIGS. 6 and 7. In FIG. 6, the different clock rates are adjusted in order to keep an off-set constant and to avoid an increasing clock off-set between nodes over the time. FIG. 7 illustrates another correction method, namely to correct a detected time off-set. Such an adjustment brings both clocks at the beginning of a cycle close together, but both clocks again show a larger difference at the end of both cycles.

Figure 8:
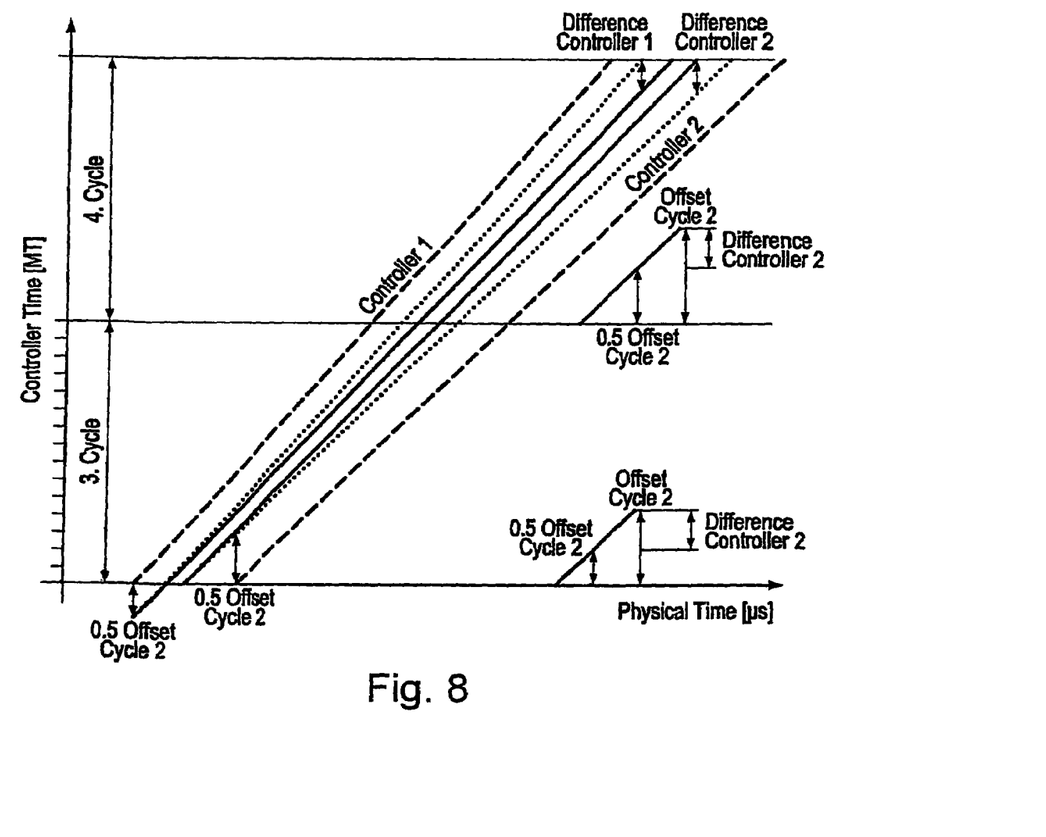
FIG. 8 illustrates a combined off-set and clock rate correction.

An improved clock adjustment procedure is shown in FIG. 8. For each clock adjustment, the clock is corrected with respect to the clock rate and the clock off-set.

The time of the clocks "controller 1" and "controller 2" are indicated by dashed lines. The off-set corrected clocks are respectively indicated by dotted lines. The additionally clock rate corrected clocks are shown by bold lines. As a result, both clocks stay dose together and clock deviation do not increase over time.

The correction values are calculated from measured clock differences stored in a memory. As described in connection with FIG. 4 the nodes which are used for measuring time differences are marked by a special flag. For the calculation of a global time, each node applies the same algorithm. In a simple approach, each node calculates the mean difference in order to arrive at a correction value. Preferably, a more sophisticated calculation procedure is employed which is preferably a fault-tolerant average algorithm (FTA). This algorithm discards the largest and smallest value detected and calculates the average of the remaining two values having the largest difference in order to calculate a correction value.

The clock synchronization algorithm that is executed by each of the nodes individually performs for every two consecutive slots the step of determining the difference between expected and observed arrival times for the incoming message.

The detected differences are stored in a memory and after detection of corresponding difference values during the second cycle, correction values, namely a rate correction and an off-set correction are calculated.

Figure 9:
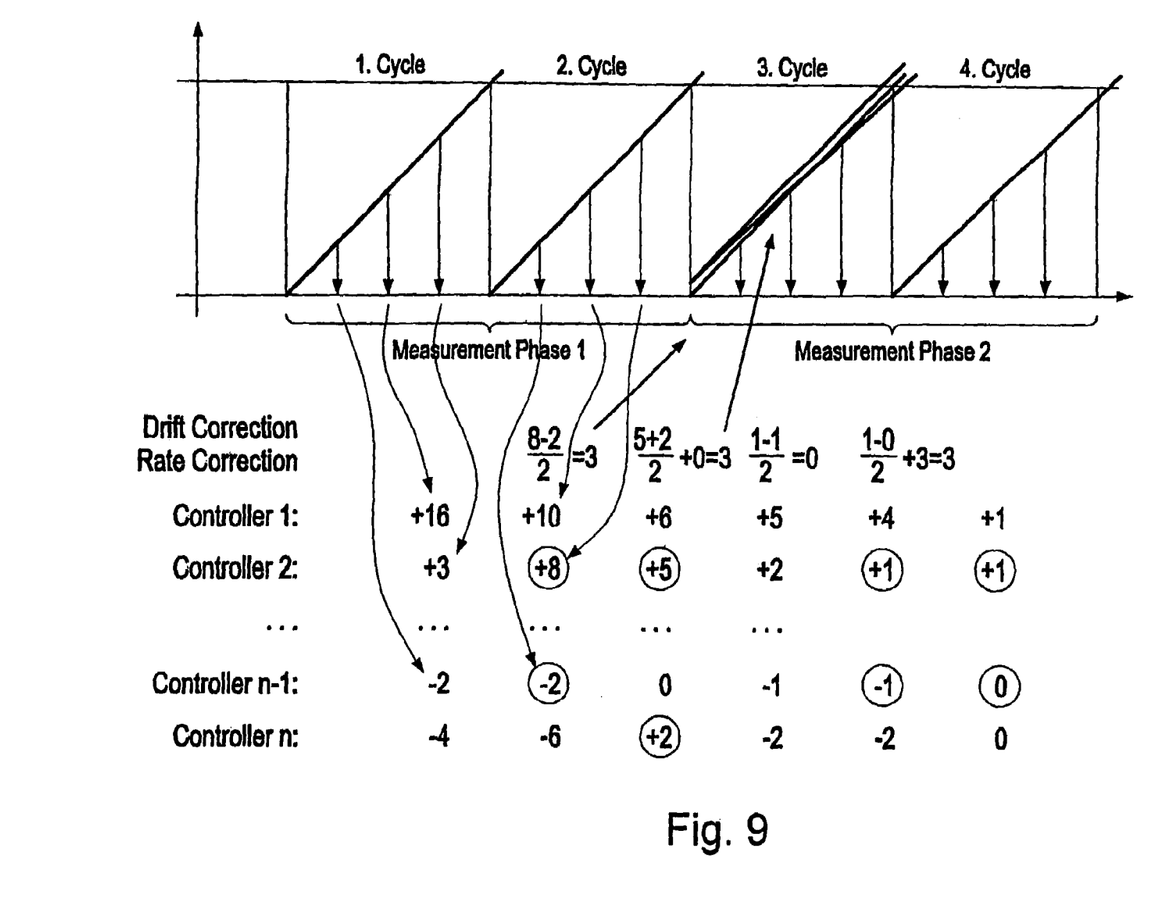
FIG. 9 shows an illustrated example of clock synchronization according to a preferred embodiment of the present invention.

As shown in FIG. 9, the clock synchronization algorithm comprises three distinct phases for every two consecutive cycles, namely a measurement phase, a calculation phase, and a correction phase.

The measurement phase splits up into two cycles, namely cycle 1 and cycle 2. For each cycle, the time values for all valid messages with a sync bit are measured and saved in a first memory portion assigned to the first cycle and in a second memory portion assigned to the second cycle. There is no correction applied after the end of the first cycle to the local clock.

During the calculation phase, preferably carried out between cycles 2 and 3, a rate correction value and an off-set correction value are calculated. For the rate correction, differences between the measured values stored in the first and second memory portion are computed. From the computed difference values, two values are selected depending on a predefined rule, which in turn is based on the number k of valid sync messages. Such a predefined rule and a fault-tolerant midpoint algorithm (FTA/FTM) in general are specified on pages 1-36 in Welch, J. L., Lynch, N.A.: "A New Fault-Tolerant Algorithm for Clock Synchronization", published in "Information and Computation", vol. 77, no. 1, April 1998 and reference is made to this document. Both selected values are added and divided by 2. The result is combined with the previous clock rate correction value in order to incrementally improve the clock rate correction.

For the off-set correction, again two nodes are selected depending on the number k of valid sync messages. The selection corresponds to the selection procedure of the rate correction and again reference is made to the above-mentioned document published by Welch and Lynch. The two selected difference values from the second memory are added and divided by 2.

Referring to FIG. 9, to the values calculated for different nodes are listed according to the node number. The first column shows the measurement results for the first cycle, the second column for the second cycle. The third column corresponds to the differences calculated between both measured deviations for the first and second cycle. The calculated correction values are shown above these values and are applied to the local clock as shown on the top of FIG. 9.

The correction phase also splits up into two separate steps, namely a rate correction and an off-set correction. The calculated rate correction value is applied to the subsequent two cycles, namely cycle 3 and cycle 4 to correct the clock frequency. The off-set correction value is only applied at the beginning of the succeeding cycle, namely cycle 3. No further off-set correction will be applied at the beginning of cycle 4.

This synchronization procedure is repeated for two consecutive cycles and the cycle numbers may be generalized being cycle ($2n-1$) and cycle ($2n$).

Figure 10:
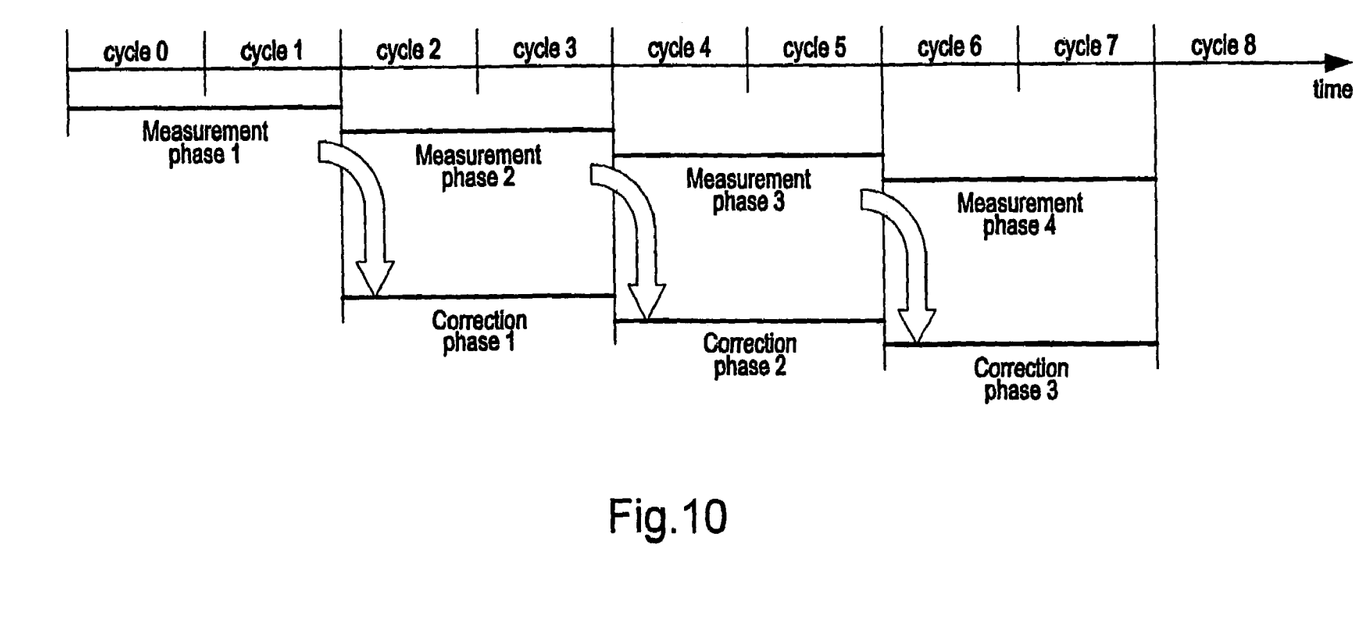
FIG. 10 shows the sequence of measurement and correction phases over time according to a preferred embodiment of the present invention.

The particular 2-cycle scheme for applying the new synchronization method is shown in detail in FIG. 10.

With respect to the fault-tolerant algorithm used for the calculation of the correction values, it is noted that each known fault-tolerant algorithm may be used, as long as each of the nodes applies the same algorithm.

The frequency of each of the local clocks may be adjusted by applying one of a plurality of different of known possibilities, e.g. VCO having a frequency which may be adjusted based on an applied voltage, circuits which control the conversion of clock ticks to counter values by adjusting the number of clock ticks per time unit in order to apply a fractional rate correction.

A generalized synchronizing algorithm of a preferred embodiment of the present invention operates as follows.

Round $k_0$: collect all $c(i,j,k_0)$ in node j, being tagged sync messages;

$c(i,j,k)$ being a difference between observed and expected time in "micro ticks", i.e. local micro ticks. When $t(i,j,k)$ being the physical time for node j expecting the start of slot i and $s(i,j,k)$ being the physical time observed at node j for the beginning of slot i, then $c(i,j,k)$ can be defined as follows:

$$c(i,j,k)=Int\ s(i,j,k)-t(i,j,k))[\text{micro ticks}].$$

Round ($k_0$+1): collect all $c(i,j,k_0+1)$ in node j for all tagged sync messages.

At the end of round ($k_0$+1) the off-set inputs at node j for slot i are $$of(i,j,k_0+1)=c(i,j,k_0+1)$$

and the rate differences are $$st(i,j,k_0+1)=c(i,j,k_0+1)-c(i,j,k_0).$$

Generate for each, new round ($k_0$+2) a new off-set value $o(j,k_0+2)$ and a new rate correction value $d(j,k_0+2)$ according to:

$$o(j,k_0+2)=FT(of(i,j,k_0+1))$$

$$d(j,k_0+2)=FT(st(i,j,k_0+1))+d(j,k_0)$$

Adjust the clock at the beginning of the next cycle by $o(j,k_0+2)$

Adjust the clock frequency continuously by $d(j,k_0+2)$ for round ($k_0$+2) and round ($k_0$+3).

According to an alternative embodiment, the set of clock rate deviations and the set of time deviations are determined separately. The clock rate deviations are determined by comparing two time intervals, an observed time interval and an expected time interval for two subsequently received messages form the same node. The observed time interval is measured by means of a counter between the actual arrival times of two messages from the same node, preferably in units of micro ticks. The expected time interval is calculated from the expected receiving times of the messages for the node which are known beforehand and stored at each node. The difference between both time intervals indicates a deviation due to clock rate differences between both nodes. A clock rate correction value is calculated based on the calculated set of clock rate deviations in the above-described manner.

A single set of time deviations is sufficient for calculating an off-set correction value as described above. Preferably, an off-set correction value and a set of time deviations are only calculated once for every two cycles in this alternative embodiment.

The particular characteristics of the algorithms of the present invention are that the measurement and adjusting intervals do not overlap and the rate correction is not affected by time faults. In addition, this algorithm requires a cycle count in order to appropriately apply the measurement, calculation and adjusting steps.

With respect to the memory effort, not all detected difference values need to be memorized, but only those which are relevant according to the applied fault-tolerant algorithm.

Figure 11:
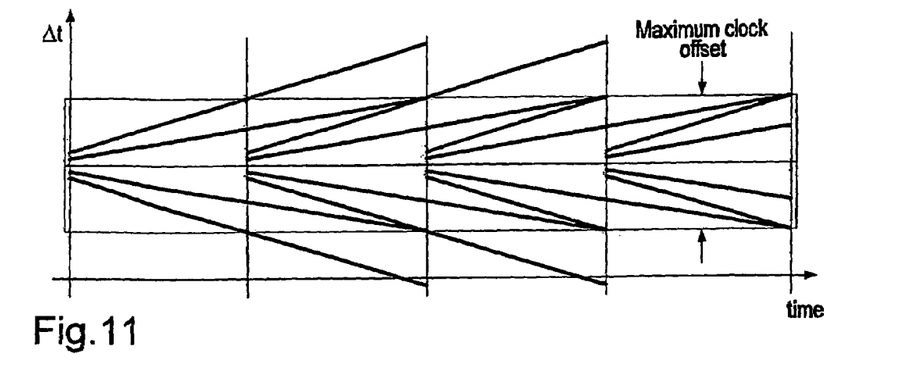
FIG. 11 illustrates the achievable maximum clock off-set when employing off-set correction.
Figure 12:
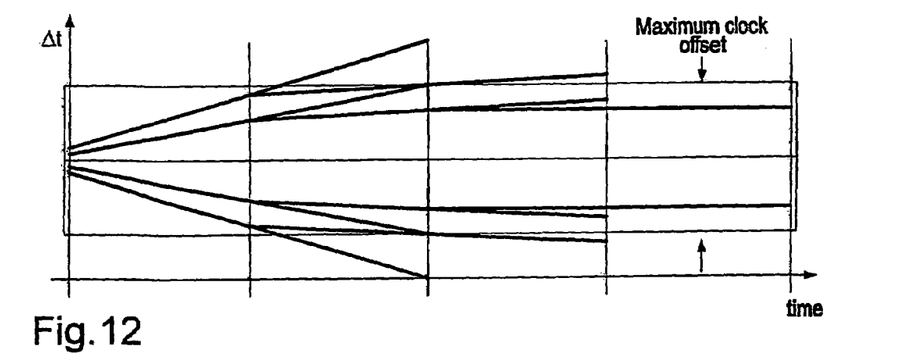
FIG. 12 illustrates the achievable maximum clock off set when employing rate correction.
Figure 13:
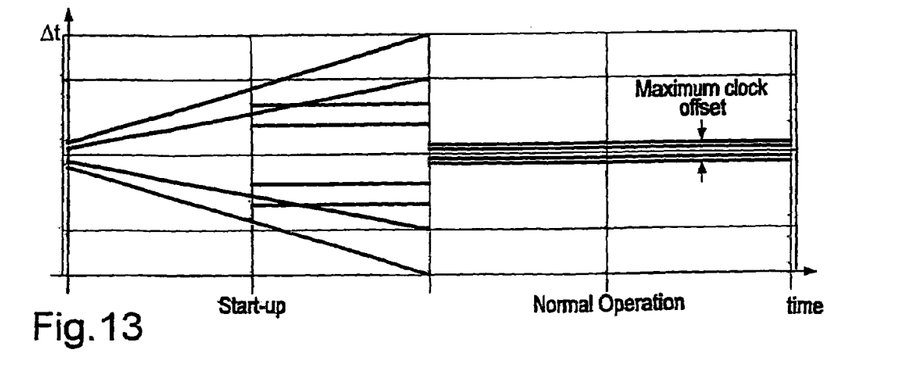
FIG. 13 illustrates a maximum clock off-set achievable when employing a clock synchronization according to the present invention.

The reduction of the maximum clock off-set which may be achieved based on clock synchronization can be seen from FIGS. 11 to 13. FIG. 11 illustrates a maximum clock off-set for an applied off-set correction and FIG. 12 for an applied rate correction. As can be seen from FIG. 12, a rate correction needs not to be applied every cycle after synchronization is established. FIG. 13 illustrates the considerable advantage of the present invention to arrive at a much lower maximum clock off-set. Again, the correction procedure may be applied less frequently after a synchronization is established once.

According to a further preferred embodiment, a drift of the global time to an extreme value may be avoided by applying further measures. For this purpose, the clock rate correction value is not applied as calculated, but the correction amount as calculated is shifted by a predetermined amount. Preferably, the rate correction value is slightly reduced. This change of the clock rate correction value results in a slightly reduced clock synchronization quality. In contrast, a steadily drift of the global time to an extreme value is avoided and all nodes will after a certain time achieve a close proximity to the mean value of the clocks to be synchronized.

For this purpose, the clock rate correction value $d(j,k_0+2)$ is replaced by a correction value $d(j,k_0+2) +/-x$; x being the reduction amount.

In addition, systematic round time errors may be compensated by amending the off-set correction value, namely by using an off-set correction value of $o(j,k_0+2)-y_j$. $y_j$ being a positive value.

Figure 14:
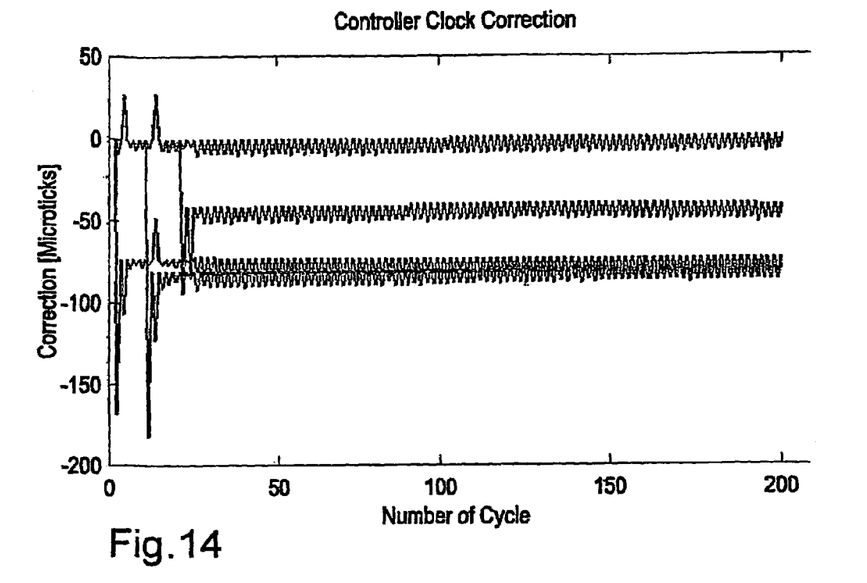
FIG. 14 illustrates an example of necessary corrections without a rate correction reduction.
Figure 15:
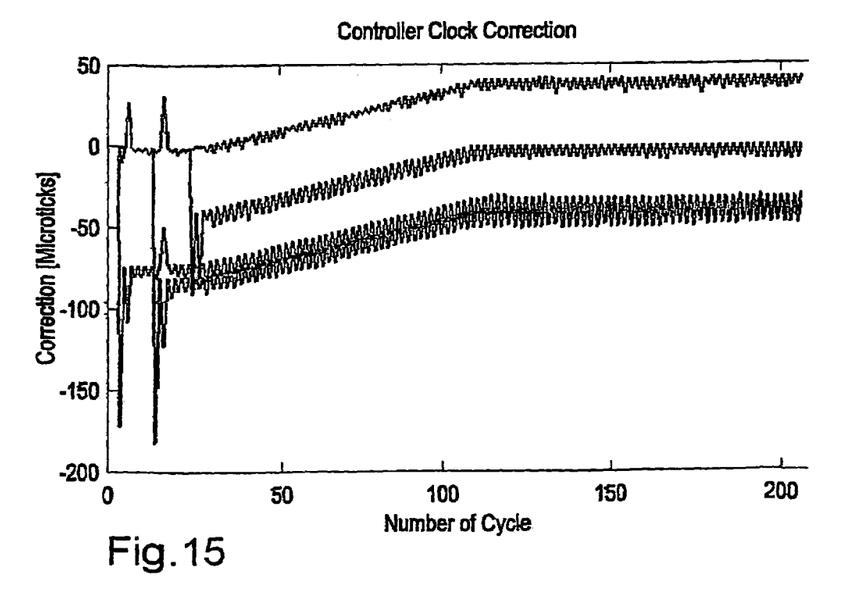
FIG. 15 illustrates an example corresponding to that of FIG. 14 with a Clock rate correction reduction according to a preferred embodiment of the present invention.

FIGS. 14 and 15 show the applied clock rate correction value for each cycle to establish clock synchronization. In FIG. 14, no correction value amendment is applied. In the given example, all the nodes synchronize to the local time of the upper node (applying no constant correction whereas other nodes apply a correction of about −50 or −80).

FIG. 15 shows the result when reducing the clock rate correction value by reducing the applied clock rate by one micro tick. The global time is shifted to the mean value of all nodes to be synchronized and there is no node not applying any correction.

Summarizing, the present invention provides an improved clock synchronization algorithm for a distributed system intended for real time applications by performing at the same time an off-set correction and a clock read correction at each node of the distributed system. Thus, expensive oscillators can be avoided and synchronization can be established faster and with higher precision.

The invention claimed is:

1. A method for synchronizing nodes (1) of a distributed system for real time applications, the nodes (1) of the distributed system are interconnected by a communication link (3) and each of the nodes (1) includes a local clock (2) and information indicating when messages are to be received from other nodes (1), each node (1) from at least a subset of all nodes (1) performs the following steps for synchronizing its local clock (2):
    (a) receiving messages from other nodes (1),
    (b) determining a set of time deviations between its own local clock (2) and all other nodes (1) of the subset of nodes (1), a time deviation being determined by measuring the difference between an expected receiving time of a received message and an actual receiving time observed based on the time of its own local clock (2),
    (c) determining a set of clock rate deviations between its own local clock (2) and all other nodes (1) of the subset of nodes (1) based on two subsequently received messages from each of the other nodes (1) of the subset,
    (d) calculating an off-set correction value based on said determined set of time deviations and calculating a clock rate correction value based on said set of determined clock rate deviations, and
    (e) adjusting the local clock (2) based on the calculated off set correction value and said calculated clock rate correction value.

2. A method according to claim 1 wherein said first determining step (b) determines a first and a second set of time deviations, and said second determining step (c) calculates said set of clock rate deviations by calculating differences between corresponding time deviations of said first and second set of determined time deviations.

3. A method according to claim 2 wherein said calculation step (d) calculates an off-set correction value based on said second set of determined time deviations.

4. A method according to claim 1 wherein said second determining step (c) determines a clock rate deviation by measuring the difference between an expected time interval and an observed time interval, said expected time interval being a time interval between expected receiving times of subsequently received messages of a particular node and said observed time interval being a time interval between the actual receiving times of the messages observed based on the time of its own local clock (2).

5. A method according to claim 4 wherein said second determining step (c) determines each clock rate deviation of said set of clock rate deviations by performing the steps of (c1) counting a time interval between actual receiving times of subsequently received messages for a particular node (1) of the subset of nodes (1) based on the time of its own local clock (2), and (c2) calculating a clock rate difference between the counted time interval for the particular node (1) and an expected time interval based on the expected receiving times of the messages for the particular node (1).

6. A method according to claim 1 wherein said distributed system is a time triggered system.

7. A method according to claim 1 wherein said information included in the node' (1) defines for every node (1) of the distributedsystem certain time slots in which a particular node. (1) is allowed to send messages on said communication link (3).

8. A method according to claim 1 wherein said information included in the nodes (1) defines access for every node (1) to said communication link (3) once within a predefined time interval.

9. A method according to claim 8 wherein a time interval having the same predefined temporal access pattern for the nodes (1) of the distributed system to the communication link (3) is continuously repeated.

10. A method according to claim 8 wherein each of the nodes (1) transmits own messages when having access to said communication link (3) according to said predefined access pattern.

11. A method according to claim 1 wherein said calculating step (d) calculates said clock rate correction value based on two clock rate deviations of said set of determined clock rate deviations according to a first predetermined rule.

12. A method according to claim 11, wherein said first predetermined rule selects two clock rate deviations which have the largest difference with respect to each other.

13. A method according to claim 11 wherein said first predetermined rule excludes clock rate deviations according to a second predetermined rule.

14. A method according to claim 1 wherein said calculating step (d) calculates said clock rate correction value by incrementing the clock rate correction value applied during the previous adjusting step with the currently calculated clock rate correction value.

15. A method according to claim 1 further comprising a step of changing the clock rate correction value provided by said calculating step (d) according to a third predetermined rule.

16. A method according to claim 15 wherein said third predetermined rule replacing said calculated clock rate correction value by a value having a slightly reduced amount.

17. A method according to claim 1 wherein said adjusting step (e) for adjusting the local clock (2) based on the calculated clock rate correction value and the calculated off-set correction value is performed for both correction values after a predetermined number of time intervals each of which defining access for every node to said communication link (2) once per time interval.

18. A computer program comprising code means adapted to perform the method according to claim 1.

19. A synchronizing unit for synchronizing a node (1) in a distributed system for real time applications, the nodes (1) in the distributed system are interconnected by a communication link (3), the synchronizing unit comprises:
- a local clock (2),
- a memory (6) for storing information indicating when messages are to be received from particular nodes (1),
- a deviation detector for determining a set of time deviations between its own local clock (2) and other nodes (1), a time deviation being determined by measuring the difference between an expected receiving time of a received message and the receiving time observed based on the time of its own local clock (2), and for determining a set of clock rate deviations between its own local clock (2) and other nodes (1) based on two subsequently received messages for a node (1),
- a correction calculation unit for calculating an off-set correction value based on said determined set of time deviations and for calculating a clock rate correction value based on said determined set of clock rate deviations, and
- an adjusting unit for adjusting the local clock based on the calculated offset correction value and on the calculated clock rate correction value.

20. A synchronizing unit according to claim 19 wherein said deviation detector being adapted to determine a first and a second set of time deviations and to determine said set of clock rate deviations by calculating differences between corresponding time deviations of said first and second set of time deviations.

21. A synchronizing unit according to claim 20 wherein said correction calculation unit calculates an off-set correction value based on said second set of determined time deviations.

22. A synchronizing unit according to claim 19 wherein said deviation detector being adapted to determine a clock rate deviation by measuring the difference between an expected time interval and an observed time interval, said expected time interval being a time interval between expected receiving times of subsequently received messages of a particular node and said observed time interval being a time interval between the actual receiving times of the messages observed based on the time of its own local clock (2).

23. A synchronizing unit according to claim 22 wherein said deviation detector comprises a counter for counting a time interval between actual receiving times of subsequently received messages for a particular node (1) based on the time of its own local clock (2).

24. A synchronizing unit according to claim 19 wherein said memory (6) storing information defining for every node (1) of the distributed system a certain temporal access pattern allowing a particular node (1) to send messages on said communication link (3).

25. A synchronizing unit according to claim 19 wherein said information included in the nodes (1) defines access for every node (1) to said communication link (3) once within a predefined time interval.

26. A synchronizing unit according to claim 19 wherein each node further comprises a transmitter for transmitting own messages when having access to said communication link (3) according to said predefined access pattern.

27. A synchronizing unit according to claim 19 further comprising a deviation memory for storing time deviations determined between the local clock (2) and the clocks (2) of other nodes (1).

28. A synchronizing unit according to claim 27 wherein said memory being adapted to store two sets of time deviations.

29. A synchronizing unit according to claim 19 further comprising a drift protection means for changing the clock rate correction value provided by said correction calculating unit and forwarding a changed clock rate correction value to said adjusting unit.

* * * * *